April 29, 1930.  A. OBERHEIM  1,756,604

HEAT CONTROL FOR BAKE OVENS

Filed Jan. 4, 1928

Albert Oberheim
Inventor
By Paul Hoton
Attorney

Patented Apr. 29, 1930

1,756,604

UNITED STATES PATENT OFFICE

ALBERT OBERHEIM, OF CHARLOTTE, NORTH CAROLINA; MABEL OBERHEIM EXECUTRIX OF SAID ALBERT OBERHEIM, DECEASED

HEAT CONTROL FOR BAKE OVENS

Application filed January 4, 1928. Serial No. 244,476.

My invention relates to means for controlling the heat in electric baking ovens in such a manner as to prevent the top portion of the loaf or other articles being baked from baking faster than the lower part of the loaf.

I have found in baking in electric ovens that when the heating elements in the top of the baking compartment become thoroughly heated in many instances the top portion of the loaf will burn before the bottom portion of the loaf is thoroughly baked.

It is an object of my invention to provide means for regulating the heat in an electric oven in such a manner as to insure an even baking of all portions of the loaf or other article being baked in the oven.

Another object of my invention is to provide adjustable shielding means between the heating elements in an electric oven and the baking compartment in such a manner as to insure an even baking at all times.

Another object of my invention is to provide means to shut off the radiating heat entirely, or partially, to prevent the burning of the bakery goods on top in the process of baking or of getting brown too fast before the goods have a chance to bake properly inside, and thus given the goods a nice bottom.

It is a known fact to all practical bakers and pastry cooks that the combination metal rods and tiles which are heated by the electric current, often get so hot that the bakery goods placed in an oven in this condition will color so fast that the inside and bottom of these goods are hardly baked and are in a bad condition from a dietetic or commercial point of view in that they do not look right nor taste right. To overcome this the expert baker knows that the only way to cope with such a situation is to turn off the current and wait until the oven is cooled off, which sometimes takes considerable time, as the top tiles and metal rods retain their heat for a long time. With my heat control located below the heated elements, all that is necessary under such circumstances to overcome this extreme heat is to pull the control bar and thus shut off the heat from the baking compartment, and in this way the oven can be used in an instant, especially for goods like almond macaroons, cocoanut kisses, meringue pies, poundcakes, fruitcakes, and such. These with the heat control will have a chance to bake slowly and thus get the proper color.

Another object of my invention is that when the baker notices that his rolls, bread or pies are coloring too fast while in the process of baking, that the heat control may be regulated as conditions may require.

This device is adapted to be used in any electric oven and it will also protect the heating elements and take the place of the metal screen now in use for this purpose of protecting the heating elements.

Some of the objects of my invention having been stated other objects will appear as the description proceeds, when taken in connection with the accompanying drawings, in which—

Figure 1:
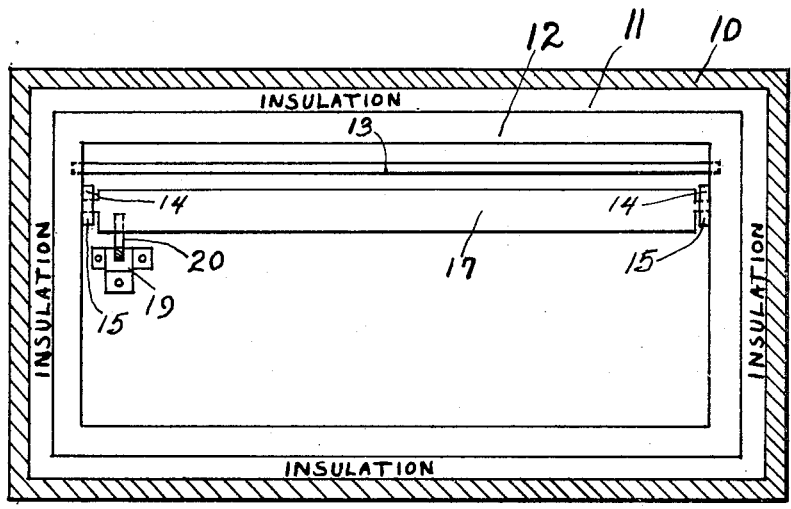
Figure 1 is a front elevation of one section of an electric baking oven with the front portion thereof removed, showing my device installed.

Referring more particularly to the drawings, the numeral 10 indicates the steel casing of an electric oven while 11 indicates the insulating material of an electric oven and 12 indicates the refractory lining of an electric oven. In the top portion of a baking compartment are the heating elements 13, which are the conventional heating elements comprising a heating element on the inside thereof with a porcelain shell and with additional heating elements wound on the outside thereof, which elements are not shown in detail for the reason that they are conventional and do not form a part of my invention.

The parts so far described are the conventional parts in electric ovens. It is customary to mount immediately below the heating elements a wire screen for the protection of the heating elements. I remove this wire screen and instead of this wire screen I install members 14 and 15 which have semi-circular notches therein, and these semi-circular notches are mounted facing each other so as to form the holes 16, and in these holes I pivotally mount the vanes 17, which vanes extend all the way across the top of the heating compartment in a transverse direction. In the front portion of the oven I cut the hole 18 and to the rear portion of each heating compartment I mount the guideway 19, and in the guideway 19 and the hole 18 I place the member 20 having cams 21 which are adapted to engage and operate the pivoted vanes 17. The member 20 projects from the forward portion of the oven and has the handle 22 mounted thereon and this forward portion of the member 21 has the markings 23, 24 and 25 thereon to indicate the position of the vanes at all times.

Figure 2:
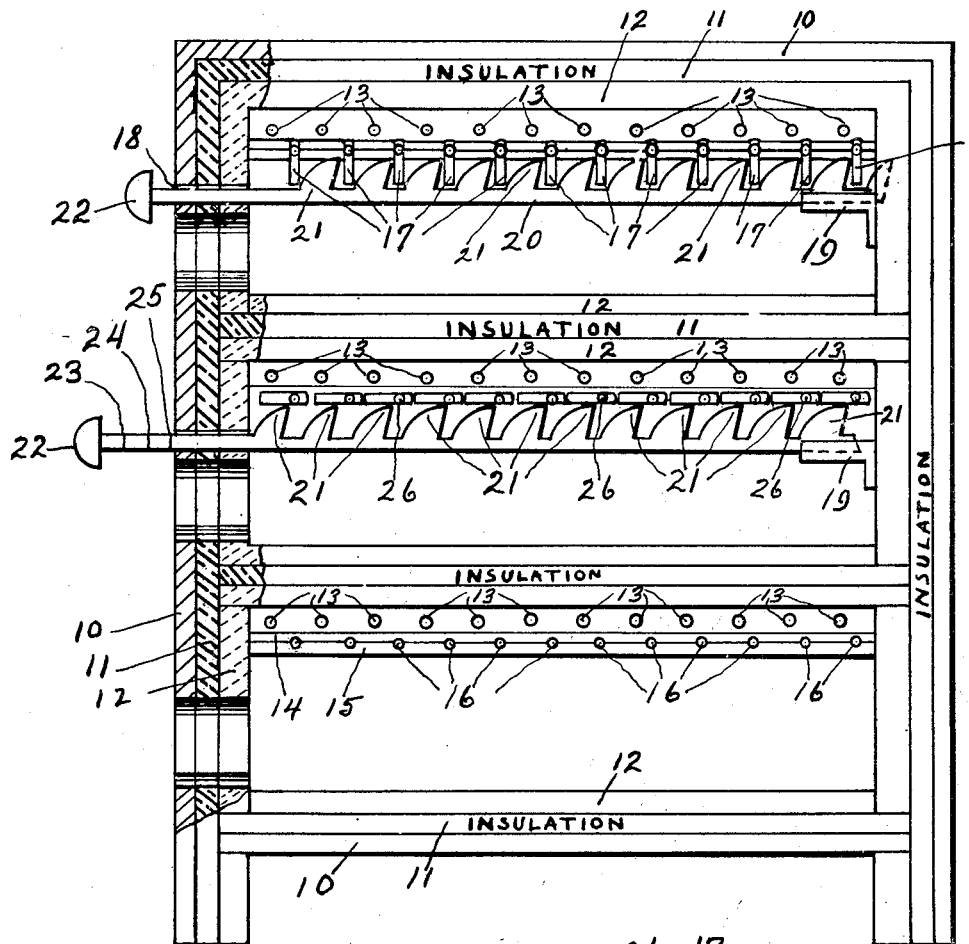
Figure 2 is a side elevation, partly in cross-section of an electric baking oven, with the side portion thereof removed for purposes of better illustration of my invention.
Figure 3:
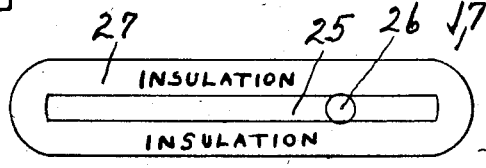
Figure 3 is an end view of one of my heat regulating vanes.

In the upper compartment in Figure 2, I have shown the vanes hanging in vertical position, which allows the heat from the heating elements 13 to strike the lower portion of the baking compartment unimpeded, while in the middle baking compartment of Figure 2 I have shown the member 20 pulled forward to a point where the vanes 17 are shown in horizontal position, thus shielding the lower portion of the baking compartment from the direct rays of heat from the heating elements, while in the lower baking compartment of Figure 2 I have shown my vanes removed in order to better illustrate the manner of installation of my device in any electric oven. It is, of course, to be understood that the vanes can be adjusted at any position from a vertical position to a horizontal position, depending upon the amount the handle 22 is pulled forward.

I preferably provide the vanes 13 with a metallic core 25 which has the pivotal points 26 and a cover of insulating material 27, such as asbestos or other suitable material.

It is thus seen that in case the baker discovers that the baking operation is being advanced faster on top of the loaf than on the bottom of the loaf, he can pull the handle 22 forward and immediately cut off a great portion of the heat from the top of the loaf, which will act very quickly and save the loaf from being burned on top before it is thoroughly baked. This cannot be accomplished by cutting off the current from the oven due to the fact that the heating elements require some time to cool.

In the drawings and specification, I have set forth a preferred embodiment of my invention, and although specific terms are employed, they are used in a generic and descriptive sense only and not for purposes of limitation, the scope of my invention being set forth in the appended claim.

I claim:

In a baking oven, a baking compartment, a plurality of heating elements in the upper portion of the baking compartment, a plurality of spaced vanes pivotally mounted transversely of the baking compartment, a longitudinally slidable rod disposed beneath the vanes, a cam on the rod for each vane, said rod extending to the outside of the baking compartment, said rod being adapted to slide to cause the cams thereon to move the vanes towards a horizontal position to form a protective partition between the heating elements and the lower portion of the baking compartment.

In testimony whereof I affix my signature.

ALBERT OBERHEIM.